United States Patent
Fang et al.

(10) Patent No.: US 12,222,856 B2
(45) Date of Patent: Feb. 11, 2025

(54) MEMORY CONTROLLER AND METHOD FOR CONTROLLING OUTPUT OF DEBUG MESSAGES

(71) Applicant: Silicon Motion, Inc., Hsinchu County (TW)

(72) Inventors: Hong-Ren Fang, Hsinchu County (TW); Hao-Hsuan Wang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/213,899

(22) Filed: Jun. 26, 2023

(65) Prior Publication Data

US 2024/0028508 A1   Jan. 25, 2024

(30) Foreign Application Priority Data

Jul. 25, 2022   (TW) .................................. 111127729

(51) Int. Cl.
   *G06F 12/02*   (2006.01)

(52) U.S. Cl.
   CPC ............................... *G06F 12/0246* (2013.01)

(58) Field of Classification Search
   None
   See application file for complete search history.

(56) References Cited

U.S. PATENT DOCUMENTS

2021/0200620 A1    7/2021  Sassara
2021/0365334 A1   11/2021  Sity

FOREIGN PATENT DOCUMENTS

| CN | 109656736 A | 4/2019 |
| CN | 112306783 A | 2/2021 |
| TW | 200813724 | 3/2008 |

*Primary Examiner* — Kevin Verbrugge
(74) *Attorney, Agent, or Firm* — Winston Hsu (57) ABSTRACT

A memory controller coupled to a memory device for accessing the memory device and includes a Universal Asynchronous Receiver/Transmitter (UART) and a microprocessor. The microprocessor is coupled to the UART and configured to control access operations of the memory device. The microprocessor is configured to perform an interrupt service routine in response to an interrupt. When performing the interrupt service routine, the microprocessor is configured to determine whether a predetermined signal has been received by a specific pin and when determining that the predetermined signal has been received by the specific pin, the microprocessor is configured to output a debug message through a transmitting terminal of the UART.

12 Claims, 6 Drawing Sheets

MEMORY CONTROLLER AND METHOD FOR CONTROLLING OUTPUT OF DEBUG MESSAGES

BACKGROUND OF THE INVENTION

1. Field of the Invention

The invention relates to a method for controlling output of debug messages, which is applicable when an error has occurred in a data storage device to control a memory controller thereof to output important debug messages.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes.

In the development stage of data storage device, several tests have to be performed, for example, the data storage device is accessed through a host device to ensure the stability of the data storage device product. When an error has occurred, the data storage device is likely to be in an unresponsive state, so that it can no longer be controlled by the host device. In order to find out the problem causing the error, an existing method is to modify the firmware code, and find out the execution point where the error occurs by adding a debug message. However, the existing method has to modify the firmware code repeatedly during the debugging process, and it takes time to compile and update the firmware. In addition, adding debug messages to the original firmware code may seriously affect the operation timing of the data storage device, causing the behavior of the firmware to deviate from its original behavior after modification. In this manner, the original problem may be unable to be reproduced.

To solve this problem, a novel method for controlling output of debug messages, which is applicable when an error has occurred in a data storage device to control a memory controller thereof to output important debug messages, is proposed

SUMMARY OF THE INVENTION

According to an embodiment of the invention, a memory controller coupled to a memory device for accessing the memory device comprises a Universal Asynchronous Receiver/Transmitter (UART) and a microprocessor. The microprocessor is coupled to the UART and configured to control access operations of the memory device. The microprocessor is configured to perform an interrupt service routine in response to an interrupt. When performing the interrupt service routine, the microprocessor is configured to determine whether a predetermined signal has been received by a specific pin of the memory controller and when determining that the predetermined signal has been received by the specific pin, the microprocessor is configured to output a debug message through a transmitting terminal of the UART.

According to an embodiment of the invention, a method for controlling output of debug messages, for a data storage device coupled to a host device which issues commands to the data storage device to access the data storage device, performed by a memory controller of the data storage device when the host device determines that an error has occurred in the data storage device, comprises: entering an interrupt service routine in response to an interrupt; and performing the interrupt service routine. Step of performing the interrupt service routine further comprises: determining whether a predetermined signal has been received by a specific pin of the memory controller; and outputting a debug message through a transmitting terminal of the UART of the memory controller when determining that the predetermined signal has been received by the specific pin.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
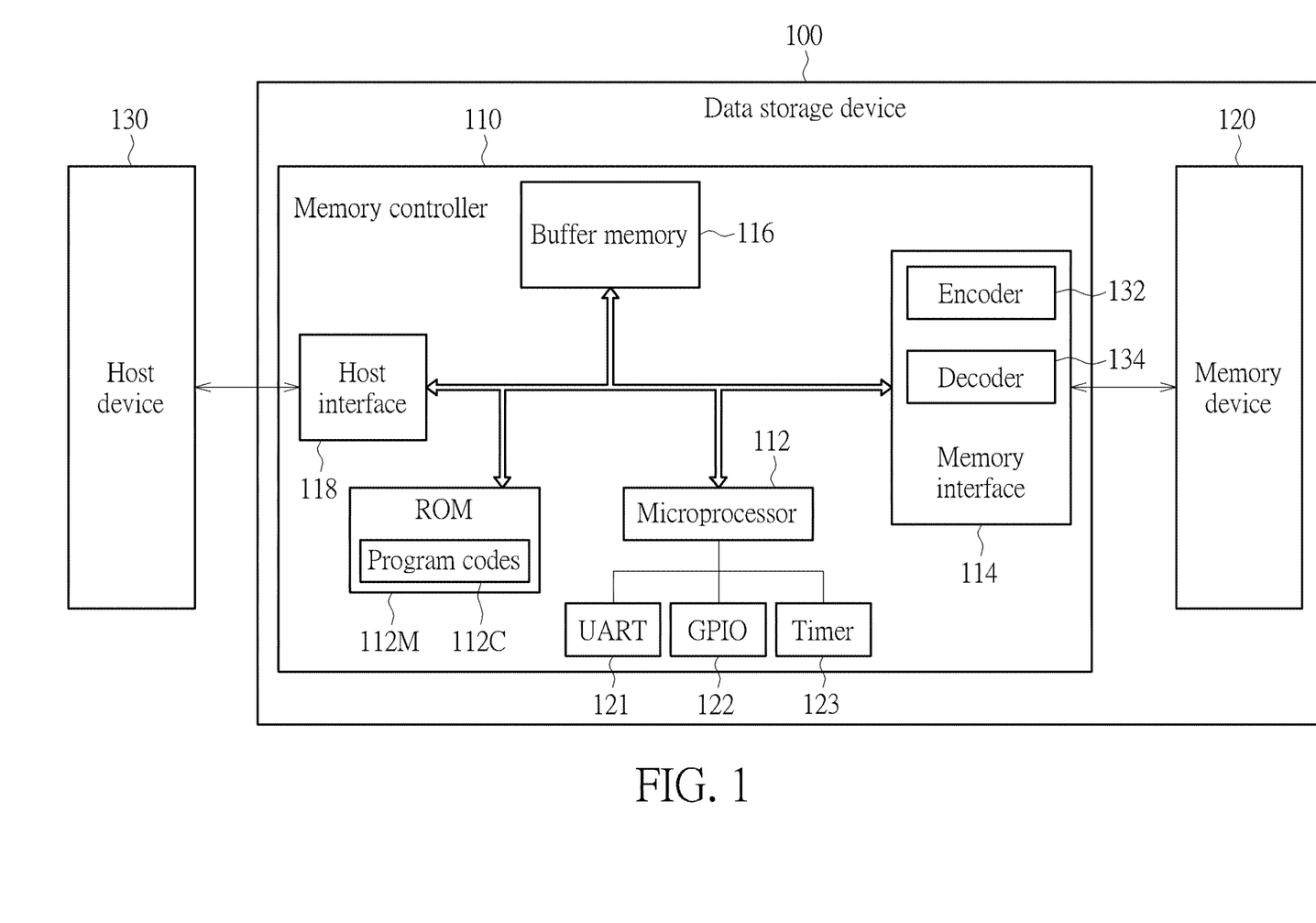
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured to decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

Figure 2:
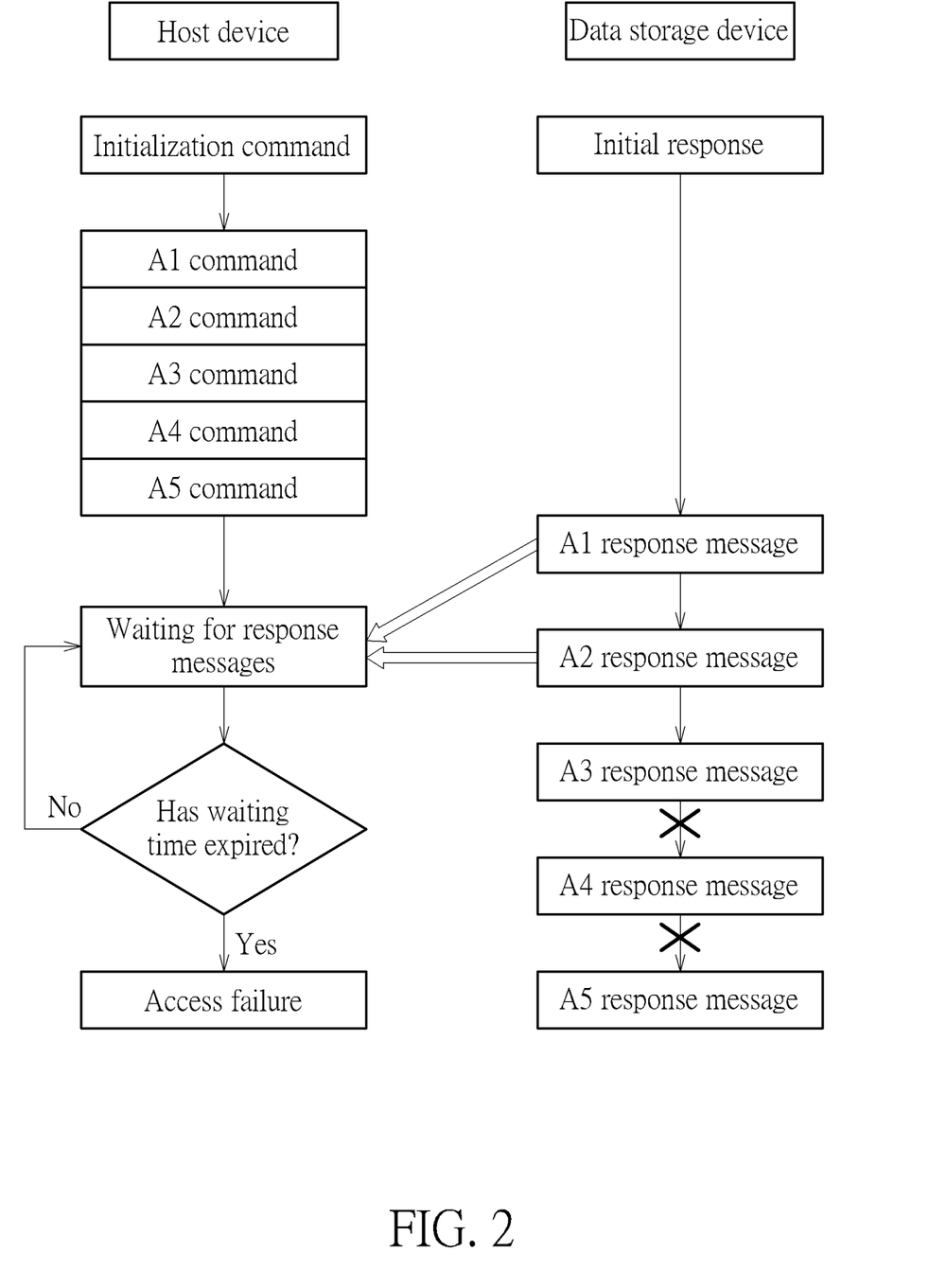
FIG. 2 shows an exemplary message flow between the host device and the data storage device.

FIG. 2 shows an exemplary message flow between the host device and the data storage device. The host device may issue an initialization command to the data storage device to provide information regarding initial configuration to the data storage device. In response to the initialization command, the data storage device may return an initialization response to the host device. After the initial configuration is completed, the host device may start to issue one or more commands to the data storage device, such as the A1 command, A2 command, A3 command, A4 command and A5 command shown in FIG. 2, so as to access the data storage device.

In addition, after sending the command, the host device may set a waiting time and wait for the corresponding response message. If the host device successfully completes reception of a response message within a corresponding waiting time, the handshake process is successful.

Therefore, in response to the A1-A5 commands issued by the host device, the data storage device should return the corresponding A1-A5 response messages to the host device. However, the data storage device may fail to send the response message due to an internal error. If the corresponding response message has not been received when the waiting time is expired, the host device may determine that the access has failed.

FIG. 2 shows a common message flow, for illustrating an exemplary case for the host device to determine an error occurred in the data storage device and the access has failed when the host device cannot receive a response message from the data storage device, for example, it cannot receive the A3-A5 response messages from the data storage device. However, since the data storage device may not perform the operations corresponding to the received commands based on the order of sequentially received commands, the host device or other external test devices cannot simply determine that an error has occurred during the time when the data storage device is performing the operation corresponding to the A3 command only based on the result of not receiving the A3 response message. Therefore, the existing debugging method is to modify the firmware code, and find out the execution point where the error occurs by adding one or more debug messages. In addition to modifying the firmware code, the existing debugging method also needs to recompile the firmware code, burn the compiled firmware code to the data storage device, and re-perform the same test process to reproduce the problem.

However, during the debugging process, it may be necessary to repeatedly modify the firmware code, and it will take time to compile and update the firmware. In addition, adding debug messages to the original firmware code may seriously affect the operation timing of the data storage device, causing the behavior of the firmware to deviate from its original behavior after modification, so that the original problem may be unable to be reproduced.

In order to solve the above problems, a novel debugging process, which comprises the proposed method for controlling output of debug messages, is provided, and is applicable to a debugging system.

Figure 3:
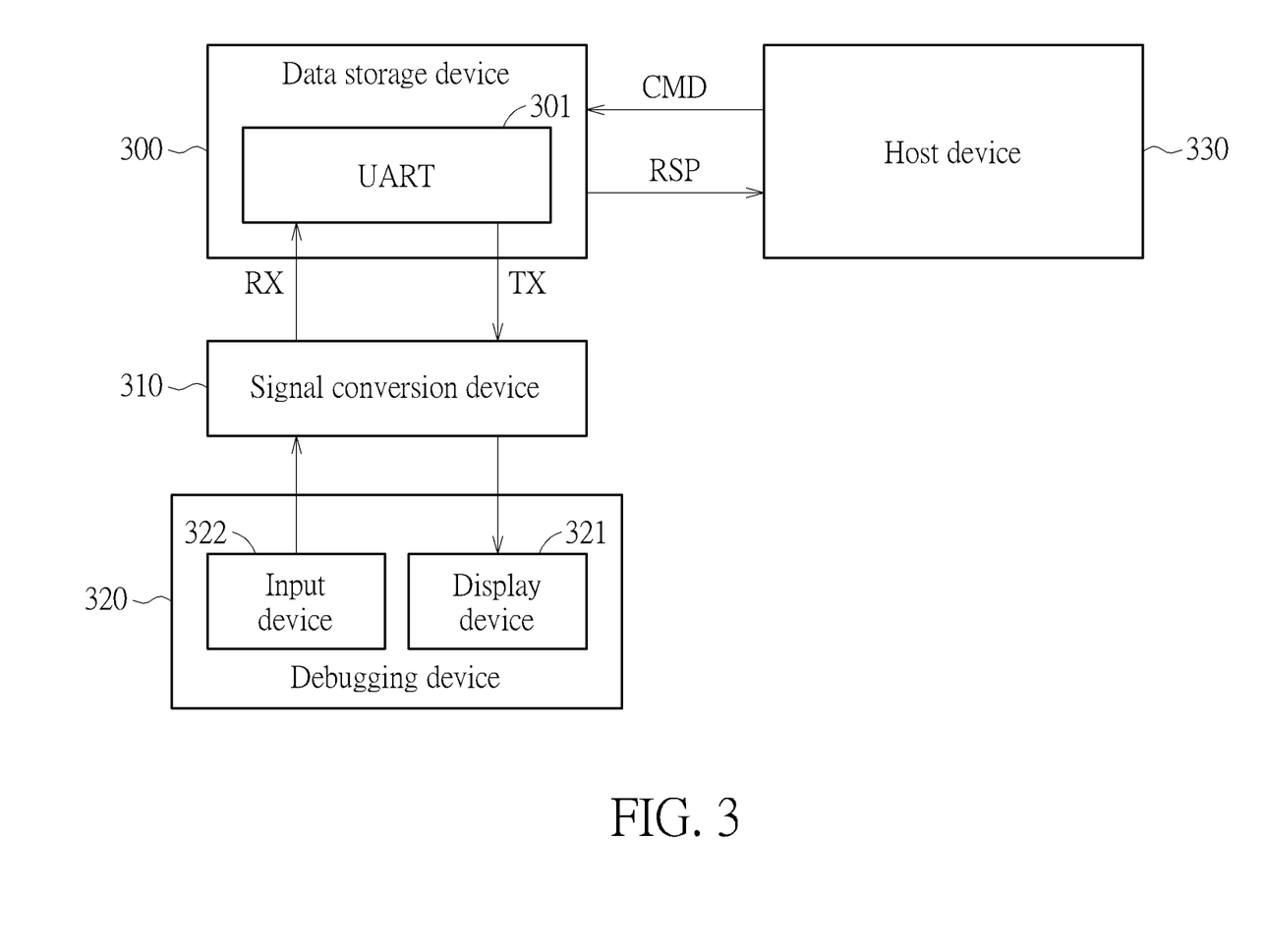
FIG. 3 shows an example block diagram of a debugging system according to an embodiment of the invention.

FIG. 3 shows an example block diagram of a debugging system according to an embodiment of the invention. The debugging system may comprise a data storage device 300, a signal conversion device 310, a debugging device 320 and a host device 330. The data storage device 300 may be the data storage device 100 shown in FIG. 1. The data storage device 300 may receive the command CMD from the host device 330 and send a response signal RSP to the host device 330. In addition, the data storage device 300 may comprise a Universal Asynchronous Receiver/Transmitter (UART) 301, which may comprise a transmitting terminal and a receiving terminal. For example, the data storage device or the memory controller may configure two specific pins, respectively to the transmitting terminal and the receiving terminal of the UART, as the corresponding pins. The data storage device 300 may communicate with the debugging device 320 through the UART interface (i.e., the UART 301). For example, the data storage device 300 may transmit a TX signal (e.g., a transmitting signal) to the debugging device 320 through the UART interface, and receive a RX signal (e.g., a received signal) from the debugging device 320 through the UART interface. The signal conversion device 310 is disposed between the data storage device 300 and the debugging device 320 to perform signal conversion, for example, converting the RX signal into a signal recognizable by the data storage device 300, and convert the TX signal into a signal recognizable by the debugging device 320. The debugging device 320 may comprise a display device 321 and an input device 322 for assisting the debugging process.

It is to be noted that, in addition to the UART, the data storage device may also comprise other devices to assist in debugging. Referring back to FIG. 1, in addition to the UART 121, the microprocessor 112 of the memory controller 110 may be further coupled to a General-purpose input/output (GPIO) 122, which may be a Vendor Specific Function (VSF) option pin, and a timer 123. The proposed debugging process will be introduced in detail in the following paragraphs.

Figure 4:
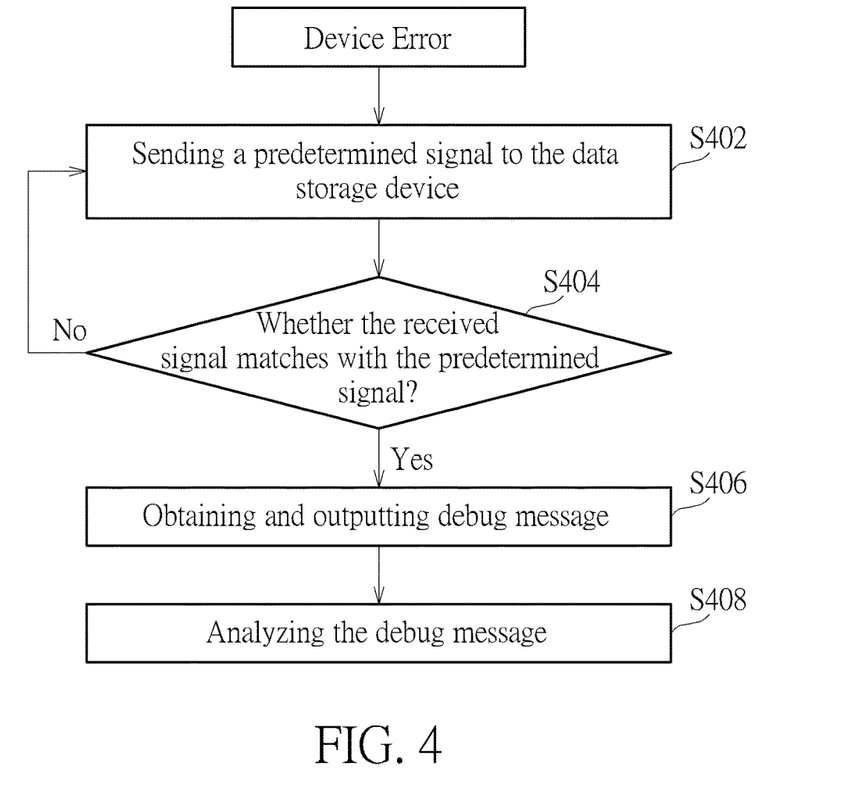
FIG. 4 is a schematic diagram showing a debugging process according to an embodiment of the invention.

FIG. 4 is a schematic diagram showing a debugging process according to an embodiment of the invention. The debugging process may be started when it is determined that an error has occurred in the data storage device (the "Device Error" shown in FIG. 4), and may comprise the following operations:

Operation S402: Sending a predetermined signal to the data storage device. As mentioned above, when the host device 330 cannot receive a response message from the data storage device 300, it may determine that an error has occurred in the data storage device 300 (e.g., the "Device Error"). In response to the determination of device error, the debugging device 320 may transmit a predetermined signal to the receiving terminal of the UART 301, and from the aspect of the data storage device 300, the predetermined signal is as a received signal of the data storage device 300. For example, the debugger may input a predetermined signal through the input device 322 of the debugging device 320 and the predetermined signal is then transmitted to the data storage device 300 through the UART interface 301.

Operation S404: In response to the received signal, the data storage device 300 may determine whether the received signal matches with or conforms to a predetermined signal recognizable or known by the data storage device 300. For example, the predetermined signal may be a specific string, a character, a signal with a predetermined pattern or a predetermined voltage level, or other specially defined signals. If the received signal of the data storage device 300 matches with or conforms to a known predetermined signal, the operation S406 is performed. If not, the operation S402 is returned to wait for the signal received from the DRAT interface.

It should be noted that returning to operation S402 to wait for a signal received from the DRAT interface may also be regarded as that the data storage device 300 does not perform any specific operation. That is, if the received signal does not match with or conform to the predetermined signal, the data storage device 300 does not perform any operation until the next interrupt is received.

Operation S406: Obtaining relevant information of the data storage device 300 as the content of a debug message, and output the debug message through the transmitting terminal of the UART 301.

Operation S408: Analyzing the debug message to find out the point where the error occurs. For example, the debug message may be displayed on the display device 321 of the debugging device 320 for the debugger to analyze the debug message.

Figure 5:
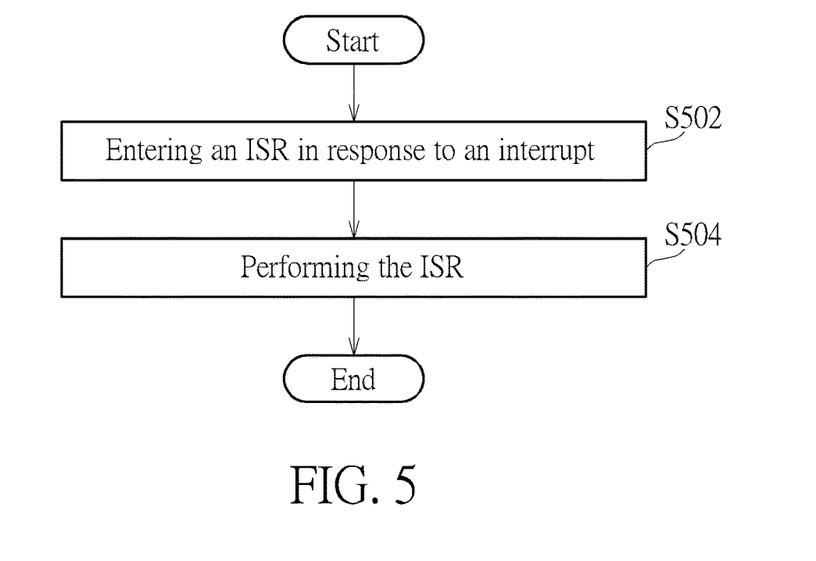
FIG. 5 is an exemplary flow chart showing a method for controlling output of debug message according to an embodiment of the invention.

FIG. 5 is an exemplary flow chart showing a method for controlling output of debug messages according to an embodiment of the invention. The proposed method for controlling output of debug messages is applicable to a data storage device, such as the data storage device 100 shown in FIG. 1 and/or the data storage device 300 shown in FIG. 3, and may comprise the following steps performed by the memory controller of the data storage device, such as the memory controller 110 shown in FIG. 1:

Step S502: invoking or entering an interrupt service routine (ISR) in response to an interrupt.

Step S504: performing the ISR. When performing the ISR, the memory controller 110 may further perform the following steps:

Step S504-1: determining whether a predetermined signal has been received by a specific pin of the memory controller 110 (as an example, Step S504-1 may correspond to the operation S404 shown in FIG. 4).

Step S504-2: outputting a debug message through the transmitting terminal of the UART of the memory controller when determining that the predetermined signal has been received by the specific pin (as an example, Step S504-2 may correspond to the operation S406 shown in FIG. 4).

In the embodiments of the invention, the predetermined signal may be input to the data storage device through the UART interface, so that the microprocessor 112 of the memory controller 110 may enter a function of a special mode (for example, the aforementioned ISR) to perform related processing, and in this function, the aforementioned debug message will be output only when a specific condition is satisfied (for example, when determining that a predetermined signal is received as described above). Because the aforementioned special mode will be triggered only when debugging is required, the proposed method for controlling output of debug message output is capable of outputting the debug message in real time without affecting original behavior of the firmware code at all, and does not affect the operation timing of the firmware code as well.

According to an embodiment of the invention, an interrupt that may invoke the ISR may be triggered in response to a reception of a message or a signal at the receiving terminal of the UART. According to another embodiment of the invention, an interrupt that may invoke the ISR may be triggered in response to an expiration of a timer (e.g., timer 123) of the memory controller 110, where the timer 123 may be configured to repeatedly count for a predetermined time period.

The microprocessor 112 of the memory controller 110 may configure interrupt events during initialization procedure. For example, the microprocessor 112 may configure an interrupt for a reception of a message or a signal at the receiving terminal of the UART in the initialization procedure. In this way, whenever the receiving terminal of the UART receives a message or a signal, the corresponding hardware will send an interrupt to the microprocessor 112, and start to perform step S502. As another example, the microprocessor 112 may configure an interrupt for an expiration event of a predetermined timer configured for counting a predetermined time period in the initialization procedure. In this way, whenever the predetermined timer expires, the corresponding hardware will send an interrupt to the microprocessor 112, and start to perform step S502.

Taking the interrupt triggered by a reception of the UART as an example, the flow of configuring the UART interrupt event by the microprocessor 112 is briefly described as follows:

1. Loading a pre-programmed ISR function into the buffer memory 116.
2. Enabling the UART module (i.e., the UART 121 or UART 301).
3. Setting the UART interrupt as enabled.

In some embodiments, the status of the UART interrupt may also be cleared before the setting the UART interrupt as enabled.

Figure 6:
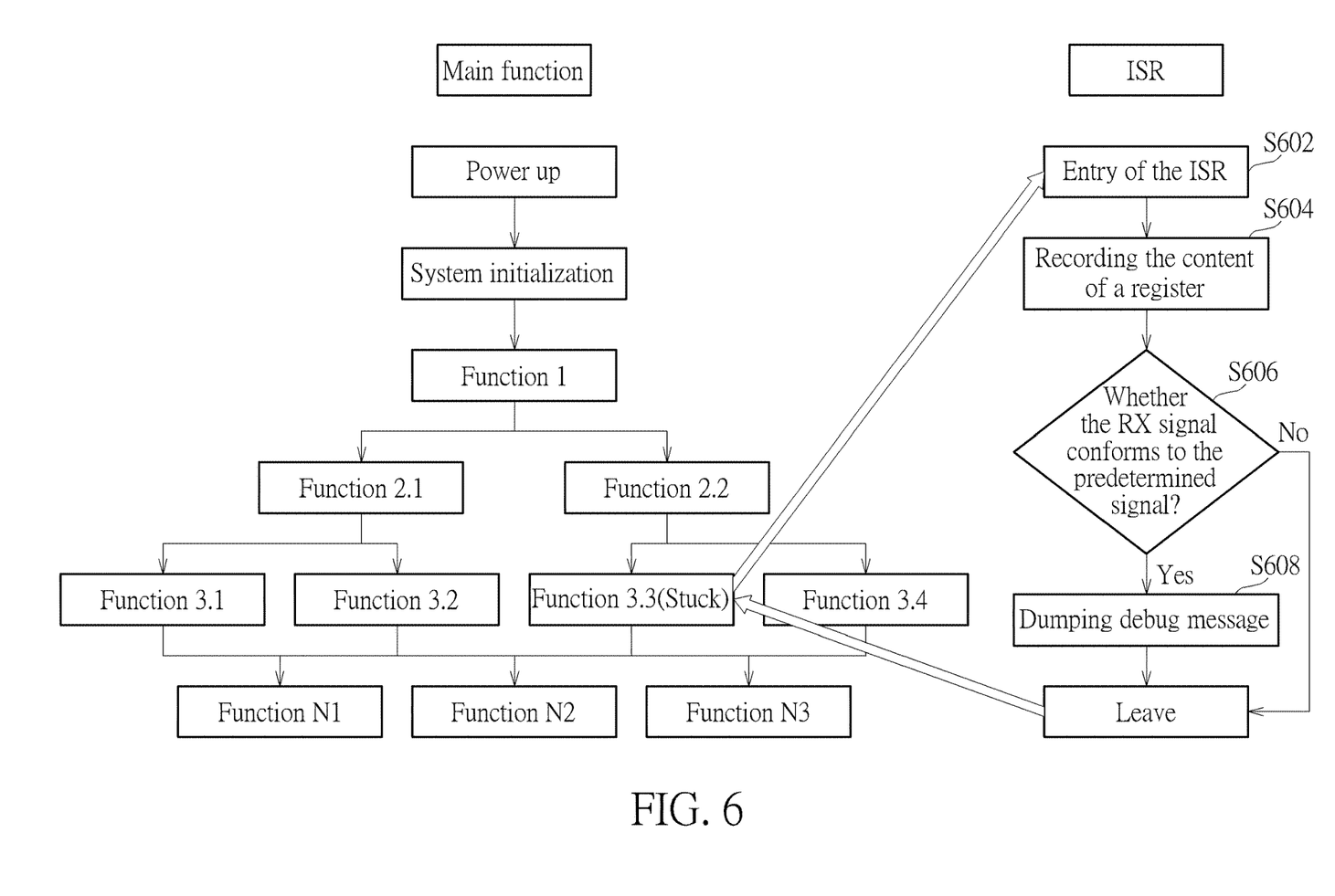
FIG. 6 is an exemplary flow chart showing the debug flow when applying the proposed method for controlling output of the debug messages.

FIG. 6 is an exemplary flow chart showing the debug flow when applying the proposed method for controlling output of the debug messages. After power up, the data storage device (such as the data storage device 100 shown in FIG. 1 and/or the data storage device 300 shown in FIG. 3) enters or operates in the main function and starts the aforementioned initialization procedure to perform system initialization and configure the interrupt events in the initialization procedure. For example, the microprocessor 112 may configure a corresponding interrupt for the received signal RX of the UART in the initialization procedure and enable the RX interrupt of the UART. Then, the microprocessor 112 may execute function 1, function 2.1, . . . etc. in the main function. The microprocessor 112 may sequentially or selectively execute function 1, function 2.1, function 2.2, function 3.1, function 3.2, function 3.3, function 3.4, function N1, function N2 and function N3 in the main function.

Assuming that an error occurs when the microprocessor 112 is executing the function 3.3 and the operation process is stuck, the host device (such as the host device 130 shown in FIG. 1 and/or the host device 330 shown in FIG. 3) may determine that the operation of the data storage device has failed or an error has occurred when the corresponding response message has not been received within the waiting time.

According to an embodiment of the invention, the host device may report that the data storage device fails to return a response message normally through a log or an execution result of a corresponding task. At this time, the debugger may input the designated UART RX string A through the input device 322 of the debugging device 320. Since the microprocessor 112 has configured and enabled interrupts for the reception of a message or a signal through the UART (e.g., for the received signal RX of the UART), the microprocessor 112 will leave the currently executing function (for example, the stuck function 3.3 shown in the FIG. 6) in response to the received signal RX of the UART (as mentioned above, which may be the UART RX signal, the UART RX string and/or the UART RX message), and jumps to the entry of the ISR (operation S602).

When entering the ISR, the microprocessor 112 may record the content of a register (operation S604), for example, the microprocessor 112 may back up a value registered by the Link Register (LR), wherein the Link Register is configured to record the memory address before the microprocessor 112 enters the ISR. The memory address is the address where a corresponding function is stored in the memory. Therefore, the stuck function may be identified by using this memory address, and the reason to cause the abnormality of the firmware can be analyzed with information of this memory address.

Next, the microprocessor 112 may check or verify the correctness of the received UART RX string (operation S606). If the received UART RX string A does not match with or confirm to a predetermined signal (for example, the content of the UART RX string A does not match with or confirm to a predetermined pattern), the microprocessor 112 may directly leave the ISR. If the received UART RX string A matches with or confirms to the predetermined signal, then the microprocessor 112 may output or dump the backup content of the register through the transmitting terminal of the UART as a debug message (operation S608), and then leave the ISR.

As mentioned above, in the embodiments of the invention, the way to trigger an interrupt is not limited to reception of the UART RX signal, and may also be the expiration of a predetermined timer. In one embodiment of the invention, similar to the flow of the method for controlling output of the debug messages shown in FIG. 6, assuming that an error occurs when the microprocessor 112 is executing the function 3.3 and the operation process is stuck, when the predetermined timer expires, the microprocessor 112 will leave the currently executing function (for example, the stuck function 3.3 shown in the FIG. 6) in response to the event of timer expiration, and jumps to the entry of the ISR (operation S602).

In addition, in the embodiments of the invention, whether a predetermined signal has been received by a specific pin is not limited to be implemented only by verifying the correctness of the received UART RX string. In some embodiments of the invention, a vendor specific function option pin may also be set as the aforementioned specific pin, and whether a predetermined signal has been received by a specific pin may also be implemented by determining whether the specific pin is coupled to a predetermined voltage through a jumper so that it is in a predetermined voltage level.

In an embodiment of the invention, similar to the flow chart of the method for controlling output of debug messages shown in FIG. 6, when entering the ISR, the microprocessor 112 may record the content of a register (operation S604), and in operation S606, the microprocessor 112 may determine whether the content of the UART RX string A conforms to a predetermined pattern, or whether the voltage level of the specific pin is at a predetermined voltage level, for example, which may be an implementation of determining whether a predetermined signal has been received by the specific pin, and here the predetermined signal is a ground voltage signal. When any one of the two determination results shows "Yes", the microprocessor 112 may output or dump the backup content of the register as a debug message through the UART transmitting terminal (operation S608). If both determination results are "No", the microprocessor 112 may directly leave the ISR.

According to an embodiment of the invention, the output debug message is not limited to comprise only the information regarding a value registered by a register used by the microprocessor 112 (for example, the aforementioned Link Register (LR)). The information to be carried in the debug message may also be one or more of the information regarding a value registered by a register used by the microprocessor 112, a record of command history of the memory controller 110, the content stored in a stack memory of the memory controller 110, the content stored in the buffer memory 116 of the memory controller 110, the value registered by one or more registers of the data storage device 100/300, etc. Upon receiving a command, the microprocessor 112 may store the current time information and content of important information in the command packet in a specific memory space for recording the command history of the memory controller 110. In addition, the stack memory (not shown in figures) of the memory controller 110 may record the process of function jumping or calling, and the buffer memory 116 may store information such as variable and/or parameter values or system tables.

Therefore, when applying the proposed method for controlling output of debug messages, not only which function is the function that causes the operation process to be stuck can be directly and clearly known, so as to obtain the correct debug direction, but also further analysis can be performed with the information carried in the debug message, so to assist the progress of the debugging process.

In addition, as mentioned above, since the triggering source of the interrupt that can invoke a specific ISR in the embodiments of the invention is not limited to the message reception event at the UART receiving terminal, and may also be the expiration event of a timer, in the embodiments of the invention, the microprocessor 112 may set or switch the triggering source of the interrupt in response to a predetermined command.

Figure 7:
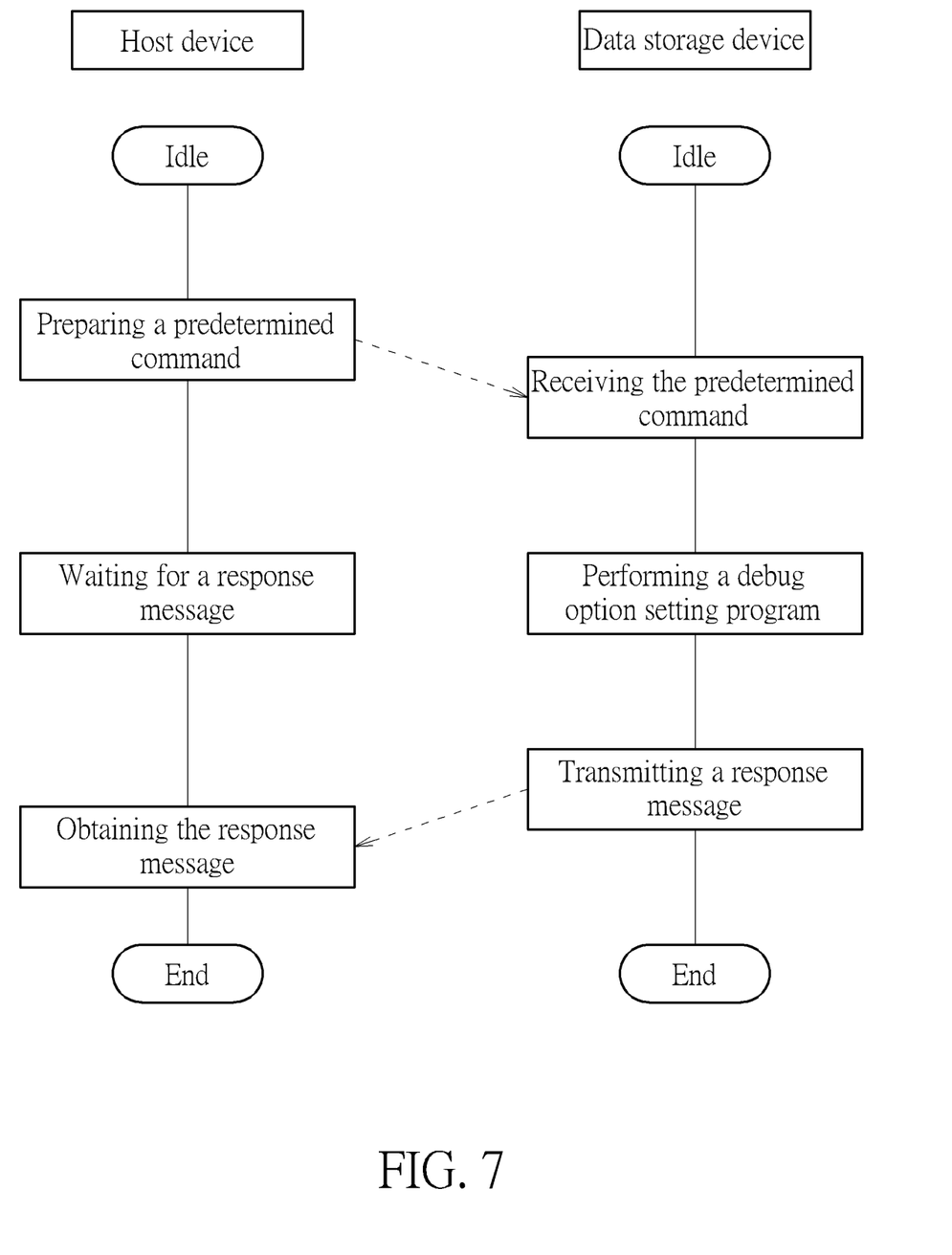
FIG. 7 is an exemplary flow chart showing the implementation of setting the triggering source of the interrupt according to an embodiment of the invention.

FIG. 7 is an exemplary flow chart showing the implementation of setting the triggering source of the interrupt according to an embodiment of the invention. In an embodiment of the invention, a vendor specific command may be used to configure, set, switch, enable or disable the triggering source of the interrupt. As shown in FIG. 7, the host device 130/330 may prepare a predetermined command, such as the aforementioned vendor specific command to set corresponding parameters, and send the predetermined command to the data storage device 100/300. The host device 130/330 may configure, set, switch, turn on or turn off the triggering source of the interrupt that can invoke the ISR through the predetermined command. After sending the predetermined command, the host device 130/330 may wait for a response message.

After the data storage device 100/300 receives the predetermined command, a debug option setting program may be performed to initialize the debug settings according to the content of the predetermined command, which may comprise the setting of triggering source of the interrupt, the setting of predetermined time period to be repeated counted by a predetermined timer, etc. After the corresponding initialization is completed, the data storage device 100/300 may send a response message to the host device 130/330. Then, both the host device 130/330 and the data storage device 100/300 may enter a standby or idle state.

According to an embodiment of the invention, the aforementioned vendor specific command may be implemented by a write buffer command of the UFS specification. In addition, in one embodiment of the invention, the debug setting may be stored in the system data area of the memory device 120, so that even if the data storage device 100/300 is shut down or encounters a power off event, the debug setting will still be preserved, and after rebooting, the data storage device 100/300 may perform initial configuration according to the contents of the debug settings during the initialization procedure.

In the embodiment of the invention, by triggering an interrupt through a specific event, the microprocessor 112 of the memory controller 110 may enter a function of a special mode (for example, the aforementioned ISR) to perform the further processing, and in this function, the aforementioned debug message will be output only when a specific condition is satisfied (for example, when determining that a predetermined signal is received as described above). Because the aforementioned special mode will be triggered only when debugging is required, the proposed method for controlling output of debug message output is capable of outputting the debug message in real time without affecting original behavior of the firmware code at all, and does not affect the operation timing of the firmware code as well, which effectively solves the problems in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller, coupled to a memory device for accessing the memory device, comprising:
   a Universal Asynchronous Receiver/Transmitter (UART); and
   a microprocessor, coupled to the UART and configured to control access operations of the memory device, wherein the microprocessor is configured to perform an interrupt service routine in response to an interrupt, and
   when performing the interrupt service routine, the microprocessor is configured to determine whether a predetermined signal has been received by a specific pin of the memory controller and when determining that the predetermined signal has been received by the specific pin, the microprocessor is configured to output a debug message through a transmitting terminal of the UART,
   wherein the microprocessor is configured to set or switch a triggering source of the interrupt in response to a predetermined command.

2. The memory controller of claim 1, wherein the specific pin is a vendor specific function option pin and the predetermined signal is a ground voltage signal.

3. The memory controller of claim 1, wherein the specific pin is a pin corresponding to a receiving terminal of the UART and the microprocessor determines whether the predetermined signal has been received by the specific pin by determining whether content of a message received at the receiving terminal of the UART conforms to a predetermined pattern.

4. The memory controller of claim 3, wherein the interrupt is triggered in response to a reception of the message at the receiving terminal.

5. The memory controller of claim 1, further comprising:
   a timer, wherein the interrupt is triggered in response to an expiration of the timer.

6. The memory controller of claim 1, wherein the debug message comprises information regarding at least one of a value registered by a register, a record of command history and content stored in a stack memory.

7. A method for controlling output of debug messages, for a data storage device coupled to a host device, wherein the host device issues commands to the data storage device to access the data storage device, the method for controlling output of debug messages is performed by a memory controller of the data storage device when the host device determines that an error has occurred in the data storage device and comprises:
   entering an interrupt service routine in response to an interrupt; and
   performing the interrupt service routine,
   wherein step of performing the interrupt service routine further comprises:
   determining whether a predetermined signal has been received by a specific pin of the memory controller; and
   outputting a debug message through a transmitting terminal of the UART of the memory controller when determining that the predetermined signal has been received by the specific pin, and
   wherein the method for controlling output of debug messages further comprises:
   setting or switching a triggering source of the interrupt in response to a predetermined command.

8. The method of claim 7, wherein the specific pin is a vendor specific function option pin of the memory controller and the predetermined signal is a ground voltage signal.

9. The method of claim 7, wherein the specific pin is a pin corresponding to a receiving terminal of the UART and whether the predetermined signal has been received by the specific pin is determined by determining whether content of a message received at the receiving terminal of the UART conforms to a predetermined pattern.

10. The method of claim 9, wherein the interrupt is triggered in response to a reception of the message at the receiving terminal.

11. The method of claim 7, wherein the interrupt is triggered in response to an expiration of a timer of the memory controller.

12. The method of claim 7, wherein the debug message comprises information regarding at least one of a value registered by a register of the memory controller, a record of command history of the memory controller and content stored in a stack memory of the memory controller.

* * * * *